(No Model.) J. W. HYATT. 2 Sheets—Sheet 2.
FILTERING APPARATUS.
No. 322,102. Patented July 14, 1885.

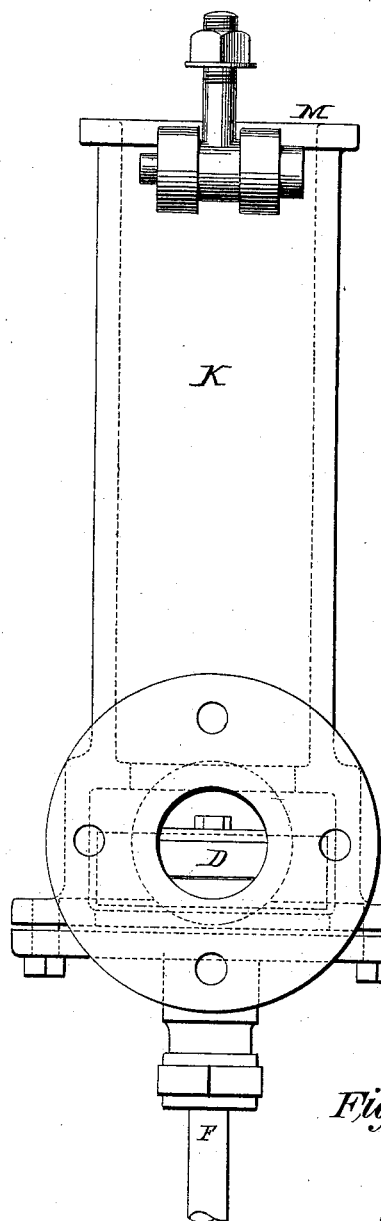
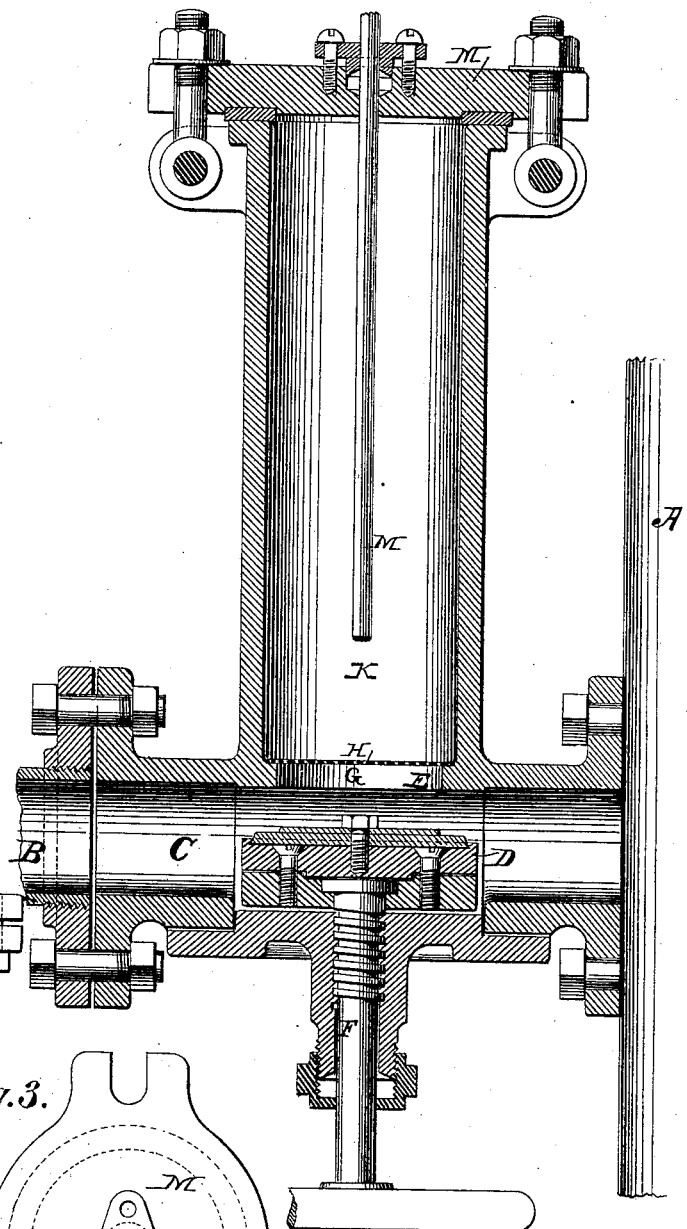
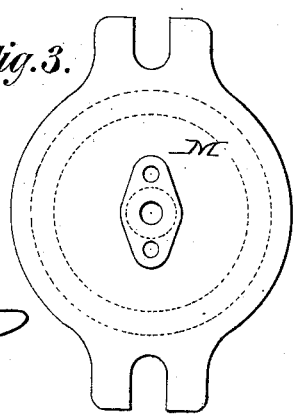

WITNESSES:
Gustave Dieterich
Herman Gustow

INVENTOR
John W. Hyatt,
BY Chas. C. Gill
ATTORNEY

UNITED STATES PATENT OFFICE.

JOHN W. HYATT, OF NEWARK, NEW JERSEY.

FILTERING APPARATUS.

SPECIFICATION forming part of Letters Patent No. 322,102, dated July 14, 1885.

Application filed April 26, 1884. (No model.)

*To all whom it may concern:*

Be it known that I, JOHN W. HYATT, a citizen of the United States, and a resident of Newark, in the county of Essex and State of New Jersey, have invented certain new and useful Improvements in Filtering Apparatus, of which the following is a specification.

The invention relates to an improvement in filtering apparatus, whereby a proper quantity of a material for coagulating the impurities or for precipitating any excess of the coagulant may be given to the water during its passage from the source of supply to the filter-bed.

The method of employing a coagulating substance in a filtering process for facilitating the arrest of the impurities by means of a filter-bed is described in several Letters Patent granted to me February 19, 1884, one of which is numbered 293,749. In said patent I have explained, also, a method of filtration, in which I first introduce into the water, contemporaneously with its passage into the filter, a substance which will produce coagulation, and then a substance which will operate to precipitate any excess of the coagulant, and thereby prevent the same from passing off in solution with the water.

The apparatus which is the subject of this application is adapted for use in the above-mentioned methods of filtering water, and its nature and method of use will appear from the detailed description hereinafter presented, reference being had to the accompanying drawings, in which—

Figure 4:
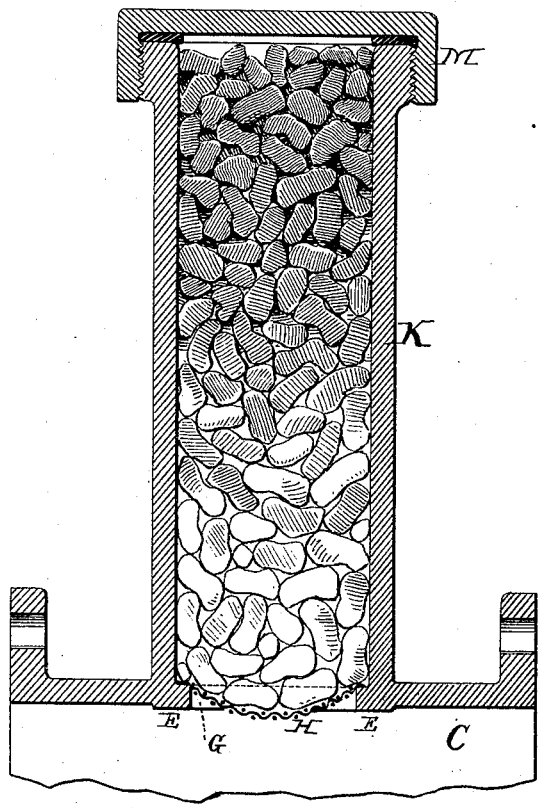
Figure 5:
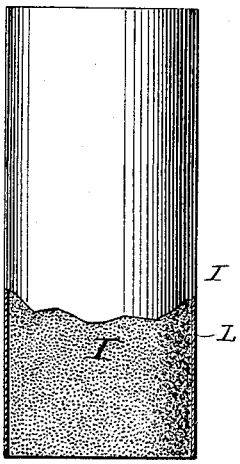

Figure 1 is an end view, and Fig. 2 is a central vertical longitudinal section, of an embodiment of the invention shown in connection with a pipe leading to a filtering apparatus. Fig. 3 is a top view of the cap to the device illustrated in Figs. 1 and 2. Fig. 4 is a central vertical longitudinal section of a modified form of the apparatus that may be used in practicing the invention. Fig. 5 is a plan view, partly in section, of a rod of solidified coagulant.

In said drawings, A denotes a filter, and B a pipe leading thereto for supplying the water. At a suitable point in the pipe B is applied the valve-casing C, inclosing the valve D, which may be caused to impinge or recede from the seat E by the operation of the threaded stem F. Above the valve E there is formed in the casing a gate, G, over which is placed a grating, H, and which leads to the receptacle K, located over the valve-casing, and having upon its upper end a cap, M, of any suitable construction. The purpose of the receptacle K is to receive and protect a rod of solidified coagulating material, I, the lower end of which will rest upon the grating H and be exposed to the action of the stream of water flowing through the pipe B, whereby a sufficient quantity of the material is taken up by the water to coagulate the impurities therein and facilitate their arrest by the filter-bed.

The coagulating material formed in the rod I may be of any suitable nature. I have used among other substances, with good results, a rod composed of about ten parts of alum to about one part of rosin, mechanically combined. In the preparation of the rod the rosin and alum are melted and thoroughly mixed together and then poured into a cylinder, L, of paper or other suitable material and allowed to cool therein, the upper end of the cylinder only being open. After the rod of coagulating material has become hardened it will be inserted into the receptacle K, the open end of the cylinder and exposed end of the rod of material being allowed to rest upon the grating H. In the absence of the rosin or equivalent agent the alum would be liable to break or crack and to too rapidly dissolve for the purposes of the invention; but when the alum and rosin are combined, the latter, not being soluble in water, binds the particles of the alum, and thus retains the form and condition of the rod, as well as preventing its rapid dissolution. Other materials may be substituted for the rosin, (such, for instance, as plaster-of-paris or mineral pitch,) if desired, and the alum may be discarded and other coagulating materials used instead thereof, according to the character of the water and the wish of the manufacturer. It is true, also, that the alum or other coagulant may be used in lump form without the rosin in filtering water to be used for certain purposes, and, also, that the coagulating material may be compacted in the receptacle K without previous formation into a rod. It will be found entirely convenient and practical, however, in most cases to make use of a solidified rod of the coagulant, protected, except as to the lower end, as hereinbefore described.

The purpose of the cylinder L is to protect all parts of the rod of coagulating material, except its lower end, from being acted upon by the water, and hence if paper is employed for the cylinder it should be coated with varnish or paraffine to prevent its disintegration by the water. If desired, the cylinder L may consist merely in protecting coating of suitable material applied directly upon the rod of material I. If the water were allowed to flow freely over all parts of the rod I, the quantity of coagulant taken up thereby could only with difficulty be properly regulated, and the results of the filtering process would be more or less uncertain and unsatisfactory. It is desirable in all cases that only that quantity of the coagulant find its way into the pipe B which will sufficiently coagulate the impurities in the water to prevent their passage through the filter-bed, for otherwise either the impurities will not be arrested or the excess of coagulating material will prove objectionable. The quantity of the coagulant allowed to be taken up by the water will depend upon the character of the impurities contained therein and other circumstances; and in the present instance I shall regulate it by means of the valve D, which will be moved near the seat E when a small quantity of coagulant is to be given to the water, and farther from said seat when an increased quantity thereof is to be taken up by the water. When the valve D is near its seat E, a reduced amount of the water is permitted to come in contact with the coagulant, and when said valve is removed farther therefrom a larger quantity of the water acts upon the coagulating material and receives an increased amount of same. When the valve D is in the position shown in Fig. 1, the full volume of water passing through the supply-pipe B will act upon the coagulant in the receptacle K, and at this time the maximum quantity of the coagulant will be taken up by the water; but when the valve has been moved, say, to a point about on a line with the longitudinal center of the supply-pipe, the volume of water will be divided, (without being diminished in quantity,) one portion passing above and the remainder below the valve, whereby but a limited quantity of the water will be permitted to act upon the coagulant, and a correspondingly-reduced proportion of the latter will be carried into the filter. In filtering water in which the impurities may be arrested without great difficulty the valve D will be moved near the seat E, for it will appear obvious that a small portion only of the coagulant is required; but when water of a different character is being treated the valve will be caused to recede farther from its seat.

The valve D is a convenient and effective regulating device; but it is not to be understood that I confine my invention to its employment, or to any special construction for dividing the current of water. It should be observed that the coagulant does not protrude into the supply-pipe, but is wholly within the receptacle K, and is not exposed to the strong action of the current of inflowing water. The manner of permitting the water to act upon the coagulant in the art to which the invention relates is important, since if the water should become overcharged therewith the result would prove unsatisfactory. According to my invention the coagulant is only exposed to the action of the water at the point where the receptacle K opens into the supply-pipe, and even at this point the coagulant is removed from the direct force of the current. The rod of material I will, of course, be gradually washed away by the flowing water, and will require to be replenished from time to time, as occasion may require. The specific gravity of the rod will serve to retain it in contact with the grating H, and the degree of its dissolution may be indicated by a rod, M, which will follow the upper surface of the coagulating material in its descent. When it is desired to insert a fresh rod of material in receptacle K, the valve D will be closed without checking the flow of water to the filter and the cap on the upper end of the receptacle opened, when another rod may be introduced.

I do not limit the use of the apparatus hereinbefore described to supplying any special coagulating material to the water, nor to the supplying of a coagulant, since by the practice of the processes hereinbefore described the coagulant may be introduced into the pipe B elsewhere, and a material for precipitating any excess of the coagulant placed in the receptacle K; for instance, sulphate of iron for coagulating may be introduced into the pipe B at any convenient point, and lime as a precipitant placed in the receptacle K; or the receptacle K may contain both a coagulant and precipitant, such as iron and lime. Nor do I limit myself to the employment of any certain number of the receptacle K. In Fig. 4 I have shown the receptacle K filled with a coagulating material in lump form, and when in this condition the water passing to the filter will move against the material and be affected as desired by it.

What I claim as my invention, and desire to secure by Letters Patent, is—

1. In combination with a filter supply-pipe, a regulating-valve arranged in said pipe, a receptacle containing a substance to be acted upon by the flowing water and supported over said valve, substantially as set forth.

2. In combination with a filter supply-pipe, a receptacle connected with said pipe and inclosing a substance to be acted upon by the flowing water, and a valve whereby the quantity of the substance taken up by the water may be regulated, substantially as set forth.

3. A supply-pipe to a filter, in combination with the valve D, arranged therein, the receptacle K, located over the valve, a gate leading into said receptacle, and an open support, H, which will permit the water flowing through the supply-pipe to enter the receptacle, substantially as set forth.

4. In combination with a filter and a supply-pipe for leading the water thereto, a receptacle, K, connected with said pipe and containing a solidified coagulating agent, and a regulating-valve, D, whereby the quantity of said agent taken up by the flowing water may be regulated, substantially as set forth.

5. In combination with a filter, a supply-pipe for unfiltered water leading thereto, a receptacle opening into the supply, and a coagulant, the latter being held by the receptacle and exposed at the said opening to the action of the inflowing water, substantially as and for the purposes set forth.

Signed at New York, in the county of New York and State of New York, this 17th day of April, A. D. 1884.

JOHN W. HYATT.

Witnesses:
  HERMAN GUSTOW,
  CHAS. C. GILL.